United States Patent
Graur et al.

(10) Patent No.: US 10,042,973 B2
(45) Date of Patent: Aug. 7, 2018

(54) EXPANSION OF ALLOWED DESIGN RULE SPACE BY WAIVING BENIGN GEOMETRIES

(71) Applicant: GLOBALFOUNDRIES Inc., Grand Cayman (KY)

(72) Inventors: Ioana C. Graur, Poughkeepsie, NY (US); Dmitry Vengertsev, Boise, ID (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 15/281,183

(22) Filed: Sep. 30, 2016

(65) Prior Publication Data

US 2018/0096093 A1 Apr. 5, 2018

(51) Int. Cl.
*G06F 17/50* (2006.01)

(52) U.S. Cl.
CPC ...... *G06F 17/5081* (2013.01); *G06F 2217/12* (2013.01)

(58) Field of Classification Search
CPC .......................... G06F 17/5081; G06F 2217/12
See application file for complete search history.

(56) References Cited

U.S. PATENT DOCUMENTS

| | | | | |
|---|---|---|---|---|
| 6,058,252 A * | 5/2000 | Noll | .................... | G06F 17/5031 716/113 |
| 6,732,338 B2 * | 5/2004 | Crouse | ................ | G06F 17/5081 716/112 |
| 7,155,689 B2 * | 12/2006 | Pierrat | ................ | G06F 17/5036 716/52 |
| 7,350,180 B1 * | 3/2008 | Slavin | ................. | G06F 17/5022 716/103 |
| 7,512,508 B2 * | 3/2009 | Rajski | .................... | G01R 31/01 438/14 |
| 7,757,190 B2 | 7/2010 | Dai et al. | | |
| 7,954,072 B2 * | 5/2011 | Liu | ........................ | G06F 17/50 382/144 |
| 8,296,693 B2 * | 10/2012 | Sasaki | ................ | G06F 17/5022 703/16 |
| 8,407,635 B2 | 3/2013 | Chopra | | |
| 8,443,322 B2 | 5/2013 | Strenski et al. | | |
| 8,549,459 B1 * | 10/2013 | Wadland | ............ | G06F 17/5077 716/100 |
| 8,578,313 B2 * | 11/2013 | Tang | .................. | G06F 17/5081 716/112 |
| 8,863,044 B1 | 10/2014 | Casati et al. | | |
| 9,032,346 B2 * | 5/2015 | Filippi | ................ | G06F 17/5081 716/100 |

(Continued)

*Primary Examiner* — Naum B Levin

(74) *Attorney, Agent, or Firm* — Thompson Hine LLP; Yuanmin Cai

(57) ABSTRACT

Systems, methods, and computer program products for design rules checking in which the waiver of design rules is optimized while ensuring compliant designs that are manufacturable. A first design rule and a plurality of patterns of a layout that violate the first design rule are received by a design rule waiver system. The design rule waiver system may process the first design rule to extract a plurality of descriptors that can be perturbed. The design rule waiver system may perturb an attribute associated with at least one of the plurality of descriptors extracted from the first design rule in order to define a second design rule that is satisfied by the plurality of patterns.

19 Claims, 2 Drawing Sheets

(56) References Cited

U.S. PATENT DOCUMENTS

| | | | |
|---|---|---|---|
| 2006/0001846 A1* | 1/2006 | Kono | G03F 7/70625 |
| | | | 355/18 |
| 2015/0112649 A1* | 4/2015 | Agarwal | G06K 9/00 |
| | | | 703/2 |
| 2016/0004669 A1* | 1/2016 | Hunter | G06F 17/30259 |
| | | | 715/243 |
| 2017/0323439 A1* | 11/2017 | Sandberg | G06T 7/0006 |

* cited by examiner

EXPANSION OF ALLOWED DESIGN RULE SPACE BY WAIVING BENIGN GEOMETRIES

BACKGROUND

The invention relates generally to semiconductor manufacturing processes and, in particular, to systems and methods for design rules checking to optimize the waiver of design rules while ensuring compliant designs that are manufacturable.

Design rule checking is an area of electronic design automation that determines whether or not the physical layout of a particular chip design satisfies a series of recommended parameters known as design rules. Design rules are a series of parameters provided by semiconductor manufacturers that enable the designer to verify a set of photomasks. In particular, a set of design rules specifies geometric and connectivity restrictions to ensure sufficient margins to account for variability inherent in semiconductor manufacturing processes and to ensure that a layout design conforms to the physical constraints required to produce it. Design rule sets have become increasingly more complex with each subsequent generation of semiconductor process.

Improved systems and methods for design rules checking are needed that optimize the waiver of violated design rules while ensuring compliant designs that are manufacturable.

SUMMARY

In an embodiment of the invention, a method includes receiving a first design rule and a plurality of patterns of a layout that violate the first design rule, and processing the first design rule to extract a plurality of descriptors that can be perturbed. An attribute associated with at least one of the plurality of descriptors is perturbed to define a second design rule that is satisfied by the plurality of patterns.

In an embodiment of the invention, a system includes one or more computer processors and a memory storing instructions that, upon execution by the one or more computer processors, cause the system to receive a first design rule and a plurality of patterns of a layout that violate the first design rule, process the first design rule to extract a plurality of descriptors that can be perturbed, and perturb an attribute associated with at least one of the plurality of descriptors to define a second design rule that is satisfied by the plurality of patterns.

In an embodiment of the invention, a computer program product includes a non-transitory computer-readable storage medium and instructions stored on the non-transitory computer-readable storage medium. Upon execution by one or more computer processors, the instructions cause the one or more computer processors to receive a first design rule and a plurality of patterns of a layout that violate the first design rule, process the first design rule to extract a plurality of descriptors that can be perturbed, and perturb an attribute associated with at least one of the plurality of descriptors to define a second design rule that is satisfied by the plurality of patterns.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
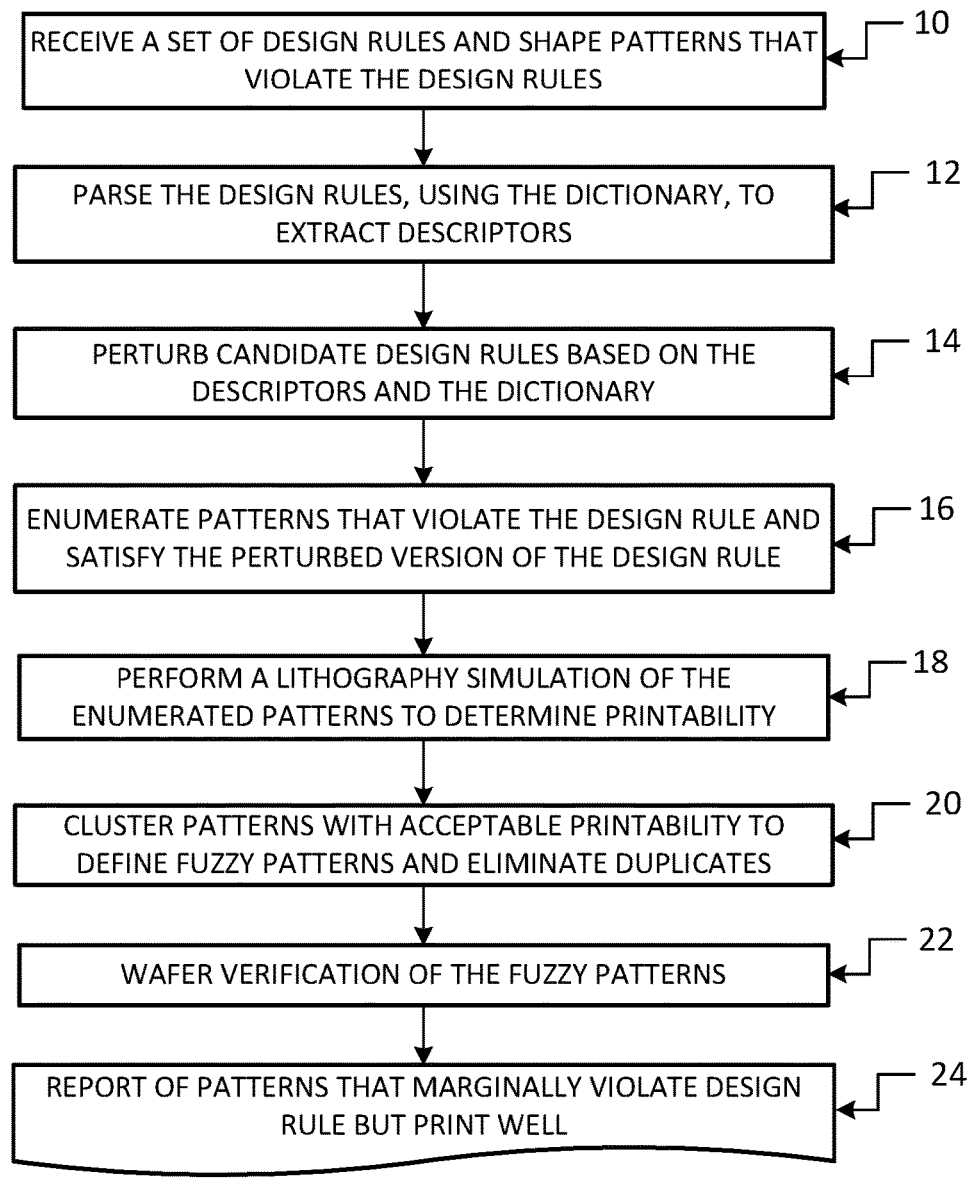
FIG. 1 is a flow chart detailing a method for expanding an allowed design rule space by waiving benign geometries.
Figure 2:
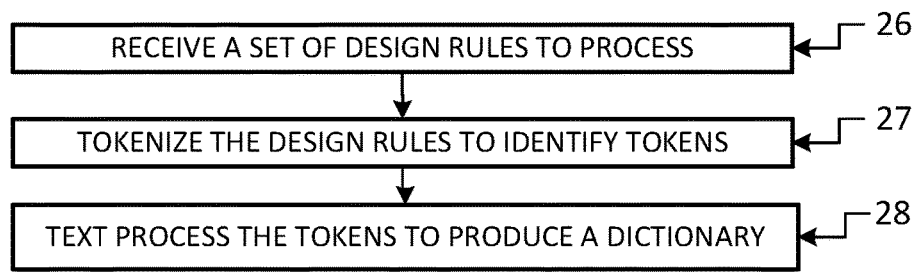
FIG. 2 is a flow chart detailing the building of a dictionary of tokens and token attributes for use in the method of FIG. 1.

With reference to FIGS. 1, 2 and in accordance with embodiments of the invention, design rule checking software receives, as input, a set of design rules and a design layout in a standardized digital file format, such as GDSII or OASIS, for a chip. The design layout includes information on shapes desired to be fabricated using a set of photomasks. The design layout is subjected to a computerized design rule check of the design layout using the design rules. The design rule check verifies the shape and sizes of various circuit components with shapes that are to be diffused, deposited, and/or etched based on the photomasks. The design rule check also verifies that shapes are of the proper size, geometry, and type, and that shapes are not placed overly close together. The design rules are crafted to ensure that a layout design conforms to physical constraints, such as manufacturing specifications, that are required to produce the layout design in order to ensure a high overall yield and reliability for the design.

In an embodiment, the design rules may comprise unary design rules that apply to one geometric element or each geometric element in a set of geometric elements in the layout. These geometric elements may comprise one or more shapes, and the unary design rules may include, but are not limited to, width rules specifying a minimum width of a shape in the design, notch rules checking the spacing of edges within a shape, and spacing rules specifying a minimum distance between two adjacent shapes in the design. In an embodiment, the shapes may be polygonal shapes. The spacing rules may be used to establish, for example, minimum well-to-well spacing and the width rules may be used, for example, to specify a minimum channel length of a transistor or a minimum metal width for a wire. The design rule checking software produces a report of design rule violations based on assessment of the shapes in the layout using the set of design rules. The report of design rule violations may be used during the manufacture of photomasks to exclude known defects that are detected in the layout design by the design rule check.

In accordance with embodiments of the invention, the report of design rule violations may be further analyzed to generate another report that includes design rule violations that can be relaxed so that a larger number of geometric elements in the layout are considered to be acceptable without compromising the yield of an integrated circuit produced with the layout design. In this manner, the allowed design rule space can be expanded by waiving benign geometries for geometrical elements with shapes that only marginally constitute design rule violations.

With specific reference to FIG. 1, the report of design rule violations and a set of targeted design rules is received by a design rule waiver system in block 10. The design rule waiver system is configured to execute a computer program that operates to reduce the instances of design rule violations such that only significant design rule violations are not eligible for waiver and such that insignificant design rule violations are eligible to be waived subject to certain conditions. The targeted set of design rules may be filtered to select only certain targeted design rules that are applied by the design rule waiver system. In particular, the design rule waiver system may filter the targeted set of design rules such that complicated or complex design rules are selected from among the targeted design rules. Certain types of design rules, such as area design rules, grid rules, origination rules, and density rules, may be excluded by the filtering performed by the design rule waiver system.

Generally, a complicated or complex design rule includes a plurality of conditions that need to be simultaneously satisfied through the application of Boolean logic, which contrasts with non-complex or simple design rules that require only a single condition to be satisfied. For example, a complex design rule may be a design rule in which the edges of different shapes are coupled. Exemplary non-complex design rules that would not be selected by the design rule waiver system in the filtered set of ground rules are "two shapes cannot be separated by a space less than a given value" or "two projecting and facing edges cannot be separated by space less than a given value". In an embodiment, the design rule waiver system may filter the targeted design rules to select only complex unary design rules containing keywords such as width, space, C-space, notch, inner vertex, outer vertex, length, runlength, size by, etc.

An exemplary complex design rule for a back-end-of-line (BEOL) metal layer that may be selected by the design rule waiver system in the filtered set of ground rules may recite:

[(M1 Line End sized outside by +0.01 μm minimum space to M1, with touching permitted.]>=0.018.

Another exemplary complex design rule for a BEOL metal layer that may be selected by the design rule waiver system in the filtered set of ground rules may recite:

[(M1 with width >=0.056 μm and <=0.070 μm) minimum space to M1 for runlength >0.072 μm]>=0.02.

In block 12, the design rule waiver system may parse the design rules in the filtered set in order to extract descriptors that can be perturbed. In an embedment of the design rule parsing, the design rule waiver system may implement lexical analysis or tokenization in which the text of the design rules is broken up into words, phrases, symbols, and other meaningful elements called tokens. The tokenization extracting the descriptors may be performed by a computer program configured to perform lexical analysis, such as a tokenizer, and with instructions that are executed by the design rule waiver system.

For example, the exemplary first ground rule may be parsed to extract the descriptors ('size by', ('outside',0.01)), ('space',('>=',0.018)), ('touching permitted',1). As another example, the exemplary second ground rule may be parsed to extract the descriptors ('width',('>=',0.056)), ('width', ('<=',0.070)), ('runlength',('>',0.072)), ('space',('>=', 0.02)).

In block 14, the descriptors become input for further processing by the design rule waiver system, which in this instance is to perturb the design rules based on the descriptors. In particular, a list of those descriptors that can be perturbed are identified by the design rule waiver system based on the content of a pre-built dictionary. To that end, the design rule waiver system may construct a set of candidate perturbed design rules using a pre-built dictionary and analogous descriptors indexed in the pre-built dictionary.

As shown in FIG. 2, the design rule waiver system may generate the pre-built dictionary from a sample set of design rules using natural language processing in block 26. The text of the design rules in the sample set contains a linear sequence of symbols in the form of alphanumeric characters, mathematical operators, words, phrases, etc. In block 27, the design rule waiver system may execute a tokenizer as a software algorithm to segment the text of the sample set of design rules into discrete tokens comprising linguistic units and to remove stop words (e.g., "to", "with"). In block 28, the design rule waiver system may execute a software algorithm that text processes the token stream output from the tokenization in order to create the pre-built dictionary. The pre-built dictionary, which may be stored in may have the form of a table keyed to the tokens and in which the token attributes are associated with the respective tokens. The tokens may be processed according to taxonomy and syntax rules with a natural language processing algorithm to generate the table in which the tokens are indexed and the attributes are stored for each token. The pre-built dictionary speeds identification of descriptors and the construction of design rules with perturbed descriptors. An example of a table serving as a dictionary for the design rule waiver and perturbation processes is shown in Table 1.

TABLE 1

| Key | Attributes |
| --- | --- |
| width | '>=', '<=', '=', '>', '<' |
| vertex | 0, inner, outer |
| . . . | . . . |

Returning to block 14 of FIG. 1, the design rule waiver system may compare the descriptors with the tokens in the dictionary and, if matching tokens are found in the table, may associate the descriptors with the corresponding set of attributes to construct the list of those descriptors that can be perturbed. For example, a candidate perturbed design rule can be constructed by changing the associated numerical value(s). As a specific example, a candidate perturbed design rule can be constructed from the exemplary second ground rule by a perturbation that decrements the value of width from ('width',('>=',0.056)) to ('width',('>=',0.054)), which relaxes the width requirement in the perturbed design rule. The perturbation may be performed incrementally or may be based on known data. Values for other types of descriptors (e.g., non-numerical descriptors) may be changed to produce a perturbed design rule. For example, the design rule from the filtered set may be perturbed to switch descriptors, such as a switch from ('vertex','inner') to ('vertex','outer'), among the multiple alternative attributes. Switches that must select from among multiple different alternatives may rely on weights to provide decisions on perturbations. For example, the options in the set{0, inner, outer} for the descriptor vertex may provide a higher weight for "outer" within a set of constraints. In an embodiment, the attribute for more than one of the descriptors may be perturbed. In an embodiment, the attribute for only one of the descriptors may be perturbed In block 16, the design rule waiver system may enumerate patterns in the design layout that violate the initial design rule but that satisfy the "perturbed" design rule. These enumerated layout patterns violate a design rule but satisfy the associated perturbed design rule having perturbed attributes for one or more descriptors.

In block 18, the design rule waiver system may verify wafer printability to confirm stability within the process window of each of the patterns satisfying the associated perturbed design rule. The enumerated patterns may be lithographically simulated through a process window to produce an image of a mask shape and a printability score is estimated for the image. The resulting image is an acceptable predictor of which patterns that pass the perturbed design rules will print on a wafer. The lithographic simulation may verify the lithographic manufacturability using models of the lithography processes for actual integrated circuit production and generates an expected exposure pattern for a mask layout. The printability score indicates a degree of match between the mask layout and the projected layout. A process window is a collection of values of process parameters that allow the circuit of the layout to be manufactured and to operate under desired specifications. For instance, a lithographic process window may be defined as a set of {focus, exposure} points required to control critical dimension variation to within a given percentage (e.g., 10%).

In block 20, the design rule waiver system may center and cluster patterns with acceptable printability using a clustering algorithm in order to generalize from samples to a population. Patterns that are near duplicates are identified by the design rule waiver system and an instance of such near duplicate patterns is kept while removing the near duplicates from the set of perturbed design rules. Clustering groups the patterns in such a way that patterns in the same group or cluster are more similar to each other than to those in other groups or clusters.

The design rule waiver system may generalize the clustered and centered patterns to create a set of fuzzy patterns. The fuzziness is added by the design rule waiver system may in order to classify the patterns. A fuzziness value can be assigned using membership functions to each condition associated with a pattern. A larger number of patterns will pass a design rule check based on a fuzzified pattern than those that will pass a design rule check based on the original pattern.

In block 22, the design rule waiver system may receive the results of wafer verification on a test substrate, which may be performed to confirm the stability of the fuzzy patterns through the process window. If the stability is confirmed, the design rule waiver system may considers a geometry for a fuzzy pattern to be benign and waivable.

In block 24, the design rule waiver system may produce a report including those patterns that marginally violate an original design rule, but that satisfy the perturbed design rule by printing well, so that the lithography process based on the report of patterns is not at risk of reducing yield. In this instance, these patterns that satisfy the perturbed design rule are considered to be benign because of the acceptable printability and, as a result, the associated violation of the original design rule is waived.

The design layout may be modified based on the pattern reports and is eventually used to fabricate a set of photomasks, which are used as physical templates to manufacture the integrated circuit specified by the design layout. To that end, different process layers of the design layout are serially imprinted in different photomasks, which are in turn used to project the layout onto a wafer. The imprinting may be done by inputting data representing the design layout for the patterns of each process layer into a device, such as an electron beam machine, and using the device to write the patterns of each process layer into the mask material.

Each photomask is configured to be coupled with an optical aligner, such as a stepping projection aligner or stepper, and used in conjunction with a lithography tool in a chip manufacturing line to replicate the pattern in a photoresist layer coating the wafer. For each process layer, electromagnetic radiation (e.g., ultraviolet light) from an exposure source light is directed through non-opaque regions of the corresponding photomask and blocked by opaque regions of the corresponding photomask in order to expose the photoresist layer. The exposed photoresist layer is then developed and baked to produce a stable pattern that defines the geometries, features, lines, and shapes of that process layer. The photoresist layer may be used, for example, as an etch mask during an etching process that transfers the pattern to a layer of material covered by the photoresist layer. This process is then repeated for each process layer of the design layout.

Figure 3:
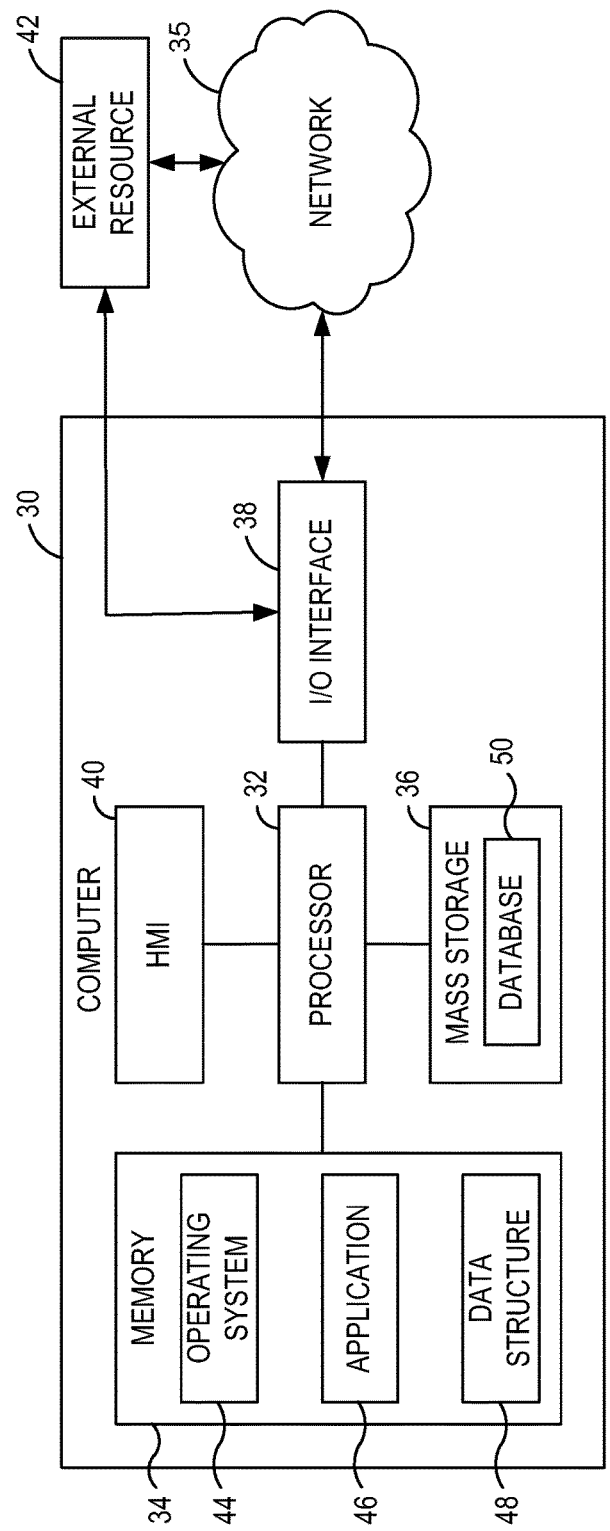
FIG. 3 is a diagrammatic view of an exemplary computer that may be used to provide an operating environment for performing the methods of FIGS. 1 and 2.

Referring now to FIG. 3, the design rule waiver system may be implemented on one or more computer devices or systems, such as exemplary computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via a network 35 or I/O interface 38. External resources may include, but are not limited to, servers, databases, mass storage devices, peripheral devices, cloud-based network services, or any other suitable computer resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing data. The mass storage memory device 36 may include data storage devices such as a hard drive, optical drive, tape drive, volatile or non-volatile solid state device, or any other device capable of storing data.

The processor 32 may operate under the control of an operating system 44 that resides in memory 34. The operating system 44 may manage computer resources so that computer program code embodied as one or more computer software applications, such as an application 46 residing in memory 34, may have instructions executed by the processor 32. The processor 32 may also execute the application 46 directly, in which case the operating system 44 may be omitted. The one or more computer software applications may include a running instance of an application comprising a server, which may accept requests from, and provide responses to, one or more corresponding client applications. One or more data structures 48 may also reside in memory 34, and may be used by the processor 32, operating system 44, and/or application 46 to store and/or manipulate data. For example, the design rule waiver system may store reports of design rule violations, the design rules, perturbed design rules, the pre-built dictionary, etc. as data structures in the memory 34.

The I/O interface 38 may provide a machine interface that operatively couples the processor 32 to other devices and systems, such as the network 35 or external resource 42. The application 46 may thereby work cooperatively with the network 35 or external resource 42 by communicating via the I/O interface 38 to provide the various features, functions, applications, processes, or modules comprising embodiments of the invention. The application 46 may also have program code that is executed by one or more external resources 42, or otherwise rely on functions or signals provided by other system or network components external to the computer 30. Indeed, given the nearly endless hardware and software configurations possible, it should be understood that embodiments of the invention may include applications that are located externally to the computer 30, distributed among multiple computers or other external resources 42, or provided by computing resources (hardware and software) that are provided as a service over the network 35, such as a cloud computing service.

The HMI 40 may be operatively coupled to the processor 32 of computer 30 to enable a user to interact directly with the computer 30. The HMI 40 may include video or alphanumeric displays, a touch screen, a speaker, and/or any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

A database 50 may reside on the mass storage memory device 36, and may be used to collect and organize data (e.g., the pre-built dictionary) used by the various systems and modules described herein. The database 50 may include data and supporting data structures that store and organize the data. In particular, the database 50 may be arranged with any database organization or structure including, but not limited to, a relational database, a hierarchical database, a network database, an object-oriented database, or combinations thereof. A database management system in the form of a computer software application executing as instructions on the processor 32 may be used to access data stored in records of the database 50 in response to a query, where the query may be dynamically determined and executed by the operating system 44, other applications 46, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming language.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. In the latter case, the chip is mounted in a single chip package (e.g., a plastic carrier, with leads that are affixed to a motherboard or other higher level carrier) or in a multichip package (e.g., a ceramic carrier that has either or both surface interconnections or buried interconnections). In any case, the chip may be integrated with other chips, discrete circuit elements, and/or other signal processing devices as part of either an intermediate product or an end product.

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refers to a direction perpendicular to the horizontal, as just defined. The term "lateral" refers to a direction within the horizontal plane. Terms such as "above" and "below" are used to indicate positioning of elements or structures relative to each other as opposed to relative elevation.

A feature may be "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, by one or more processors, a first design rule and a plurality of patterns of a design layout that violate the first design rule;
    processing, by the one or more processors, the first design rule to extract a first plurality of descriptors that can be perturbed;
    perturbing, by the one or more processors, an attribute associated with at least one of the first plurality of descriptors to define a second design rule that is satisfied by the plurality of patterns;
    producing, by the one or more processors, a pattern report that includes the plurality of patterns;
    modifying, by the one or more processors, the design layout based on the pattern report; and
    fabricating a set of photomasks based on the modified design layout.

2. The method of claim 1 wherein the first design rule comprises a unary design rule that applies to a geometric element in the layout or to each geometric element in a set of geometric elements in the design layout.

3. The method of claim 1 wherein the first design rule comprises a complex rule that includes a plurality of conditions that need to be concomitantly satisfied through the application of Boolean logic.

4. The method of claim 1 comprising:
    enumerating, by the one or more processors, the patterns that satisfy the second design rule; and
    simulating, by the one or more processors, the patterns through a process window to determine printability.

5. The method of claim 4 comprising:
    determining, by the one or more processors, a fuzzy pattern by clustering the patterns for which the printability is determined to be acceptable.

6. The method of claim 5 comprising:
    verifying, by the one or more processors, printability of the fuzzy pattern on a test substrate to confirm stability in the process window.

7. The method of claim 1 wherein processing the first design rule to extract the descriptors that can be perturbed further comprises:
    parsing, by the one or more processors, the first design rule to identify the first plurality of descriptors;
    comparing, by the one or more processors, the first plurality of descriptors with a plurality of tokens stored in a dictionary; and
    generating, by the one or more processors, a second plurality of descriptors that includes each of the first plurality of descriptors that matches one of the tokens.

8. The method of claim 7 wherein the dictionary is built using a plurality of exemplary design rules before the first design rule and the plurality of patterns of the layout are received.

9. The method of claim 7 comprising:
    building, by the one or more processors, the dictionary using a tokenizer by parsing a plurality of exemplary design rules to extract the tokens.

10. A system comprising:
    one or more computer processors; and
    a memory storing instructions that, upon execution by the one or more computer processors, cause the system to:
        receive a first design rule and a plurality of patterns of a design layout that violate the first design rule;
        process the first design rule to extract a first plurality of descriptors that can be perturbed;
        perturb an attribute associated with at least one of the first plurality of descriptors to define a second design rule that is satisfied by the plurality of patterns;
        produce a pattern report that includes the plurality of patterns;
        modify the design layout based on the pattern report; and
        cause a set of photomasks to be fabricated based on the modified design layout.

11. The system of claim 10 wherein the first design rule comprises a unary design rule that applies to a geometric element in the layout or to each geometric element in a set of geometric elements in the layout.

12. The system of claim 10 wherein the first design rule comprises a complex rule that includes a plurality of conditions that need to be concomitantly satisfied through the application of Boolean logic.

13. The system of claim 10 wherein the instructions upon execution further cause the system to:
    enumerate the patterns that satisfy the second design rule; and
    simulate the patterns through a process window to determine printability.

14. The system of claim 13 wherein the instructions upon execution further cause the system to:
    determine a fuzzy pattern by clustering the patterns for which the printability is determined to be acceptable.

15. The system of claim 14 wherein the instructions upon execution further cause the system to:
    verify printability of the fuzzy pattern on a test substrate to confirm stability in the process window.

16. The system of claim 1 wherein the instructions upon execution cause the system to parse the first design rule to extract the descriptors that can be perturbed by causing the system to:
    parse the first design rule to identify the first plurality of descriptors;
    compare the first plurality of descriptors with a plurality of tokens stored in a dictionary; and
    generate a second plurality of descriptors that includes each of the first plurality of descriptors that matches one of the tokens.

17. The system of claim 16 wherein the dictionary is built using a plurality of exemplary design rules before the first design rule and the plurality of patterns of the layout are received.

18. The system of claim 16 wherein the instructions upon execution further cause the system to:
    build the dictionary using a tokenizer by parsing a plurality of exemplary design rules to extract the tokens.

19. A computer program product comprising:
    a non-transitory computer-readable storage medium; and
    instructions stored on the non-transitory computer-readable storage medium that upon execution by one or more computer processors cause the one or more computer processors to:
    receive a first design rule and a plurality of patterns of a design layout that violate the first design rule;
    process the first design rule to extract a first plurality of descriptors that can be perturbed;
    perturb an attribute associated with at least one of the first plurality of descriptors to define a second design rule that is satisfied by the plurality of patterns;
    produce a pattern report that includes the plurality of patterns;
    modify the design layout based on the pattern report; and
    cause a set of photomasks to be fabricated based on the modified design layout.

* * * * *